(12) United States Patent
Iwata

(10) Patent No.: US 11,265,501 B2
(45) Date of Patent: Mar. 1, 2022

(54) PHOTOELECTRIC CONVERSION DEVICE AND PHOTOELECTRIC CONVERSION SYSTEM

(71) Applicant: CANON KABUSHIKI KAISHA, Tokyo (JP)

(72) Inventor: Koichiro Iwata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/242,486

(22) Filed: Apr. 28, 2021

(65) Prior Publication Data

US 2021/0344868 A1    Nov. 4, 2021

(30) Foreign Application Priority Data

May 1, 2020   (JP) .............................. JP2020-081041

(51) Int. Cl.
| | |
|---|---|
| *H04N 5/374* | (2011.01) |
| *H04N 5/345* | (2011.01) |
| *H04N 5/378* | (2011.01) |
| *H04N 5/369* | (2011.01) |
| *H04N 5/225* | (2006.01) |
| *H04N 5/3745* | (2011.01) |

(52) U.S. Cl.
CPC ....... *H04N 5/37457* (2013.01); *H04N 5/2251* (2013.01); *H04N 5/345* (2013.01); *H04N 5/378* (2013.01)

(58) Field of Classification Search
CPC .... H04N 5/37457; H04N 5/345; H04N 5/378; H04N 5/2251; H04N 5/369; H04N 5/3691

USPC .............. 348/294, 297, 308, 300, 301, 302; 257/291, 292, 293, 443; 250/208.1
See application file for complete search history.

(56) References Cited

U.S. PATENT DOCUMENTS

| | | |
|---|---|---|
| 7,741,593 B2 | 6/2010 | Iwata |
| 8,013,369 B2 | 9/2011 | Iwata |
| 8,081,245 B2 | 12/2011 | Itano |
| 8,159,577 B2 | 4/2012 | Iwata |
| 8,355,066 B2 | 1/2013 | Iwata |

(Continued)

FOREIGN PATENT DOCUMENTS

JP    2613-211833 A    10/2013

OTHER PUBLICATIONS

U.S. Appl. No. 17/241,297, filed Apr. 27, 2021, by Kazuhiro Saito et al.

*Primary Examiner* — Marly S Camargo
(74) *Attorney, Agent, or Firm* — Venable LLP

(57) ABSTRACT

A photoelectric conversion device includes pixels including first and second photoelectric converters, a memory unit, and a transfer unit for transferring signals in the memory unit to a processing unit. The pixels output a first signal based on a signal of the first photoelectric converter, and a second signal based on signals of the first and second photoelectric converters. The transfer unit performs on row-by-row a first transfer period of transferring the first signal in the memory unit and a second transfer period of transferring the second signals held in the memory unit. A column a pixel outputting the first signal transferred during the first period of a first row is arranged is different from a column a pixel outputting the first signal transferred during the first period of a second row is arranged.

18 Claims, 10 Drawing Sheets

(56) References Cited

U.S. PATENT DOCUMENTS

| | | |
|---|---|---|
| 8,368,790 B2 | 2/2013 | Itano |
| 8,415,724 B2 | 4/2013 | Iwata |
| 8,598,901 B2 | 12/2013 | Hiyama |
| 8,670,058 B2 | 3/2014 | Hayashi |
| 8,885,082 B2 | 11/2014 | Noda |
| 8,928,786 B2 | 1/2015 | Iwata |
| 9,118,857 B2 | 8/2015 | Iwata |
| 9,154,685 B2 * | 10/2015 | Matsuyama ....... H04N 5/23241 |
| 9,225,923 B2 * | 12/2015 | Hashimoto ............ H04N 5/378 |
| 9,432,607 B2 | 8/2016 | Morita |
| 9,716,823 B2 | 7/2017 | Iwata |
| 9,831,278 B2 | 11/2017 | Kato |
| 10,033,951 B2 * | 7/2018 | Ikedo |
| 10,319,765 B2 | 6/2019 | Kato |
| 10,742,905 B2 | 8/2020 | Iwata |
| 11,108,979 B2 * | 8/2021 | Sekine ................. H04N 5/3742 |
| 2013/0229557 A1 * | 9/2013 | Hashimoto .......... H04N 5/3745 |
| | | 348/301 |
| 2015/0062394 A1 | 3/2015 | Ikeda |
| 2015/0256778 A1 | 9/2015 | Kusaka |
| 2016/0101832 A1 * | 1/2016 | Inui ........................ H04N 5/369 |
| 2016/0127669 A1 * | 5/2016 | Yamazaki ............... H04N 5/378 |
| 2017/0034422 A1 * | 2/2017 | Ono .................... H04N 5/23212 |
| 2019/0098231 A1 * | 3/2019 | Iwata .................... H04N 5/341 |
| 2019/0387189 A1 | 12/2019 | Kobayashi |
| 2020/0314360 A1 | 10/2020 | Sakai |
| 2021/0015272 A1 * | 5/2021 | Chu .................... H04N 5/3745 |

\* cited by examiner

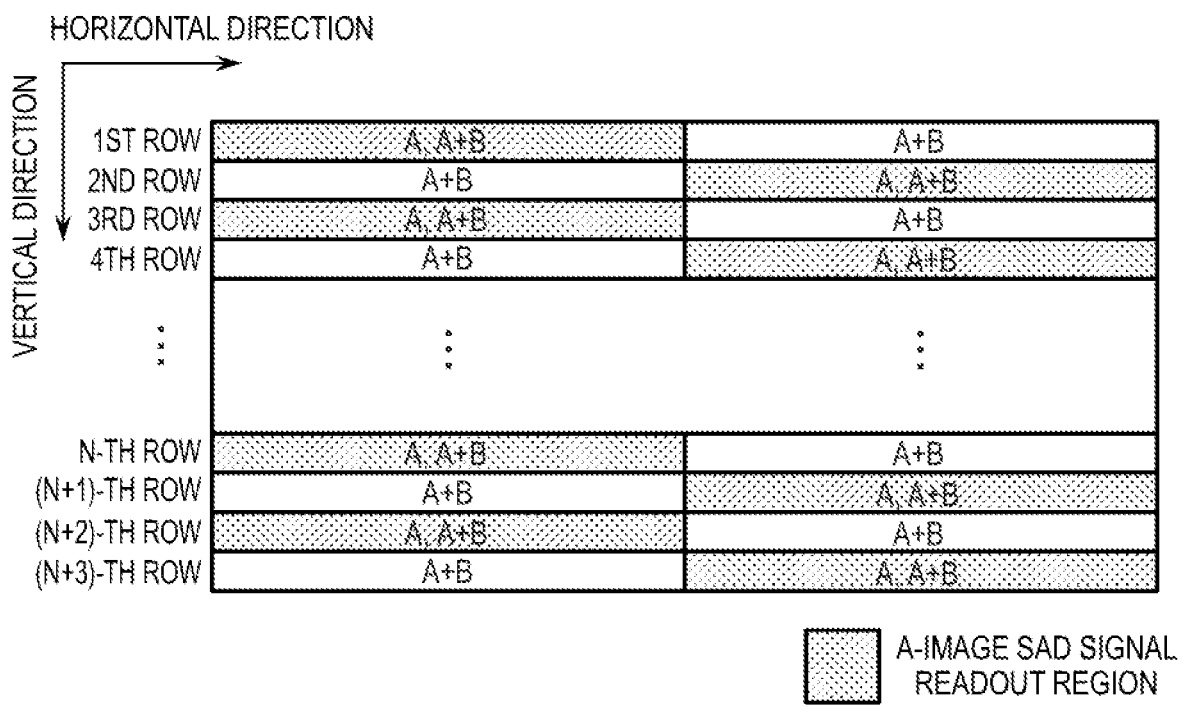
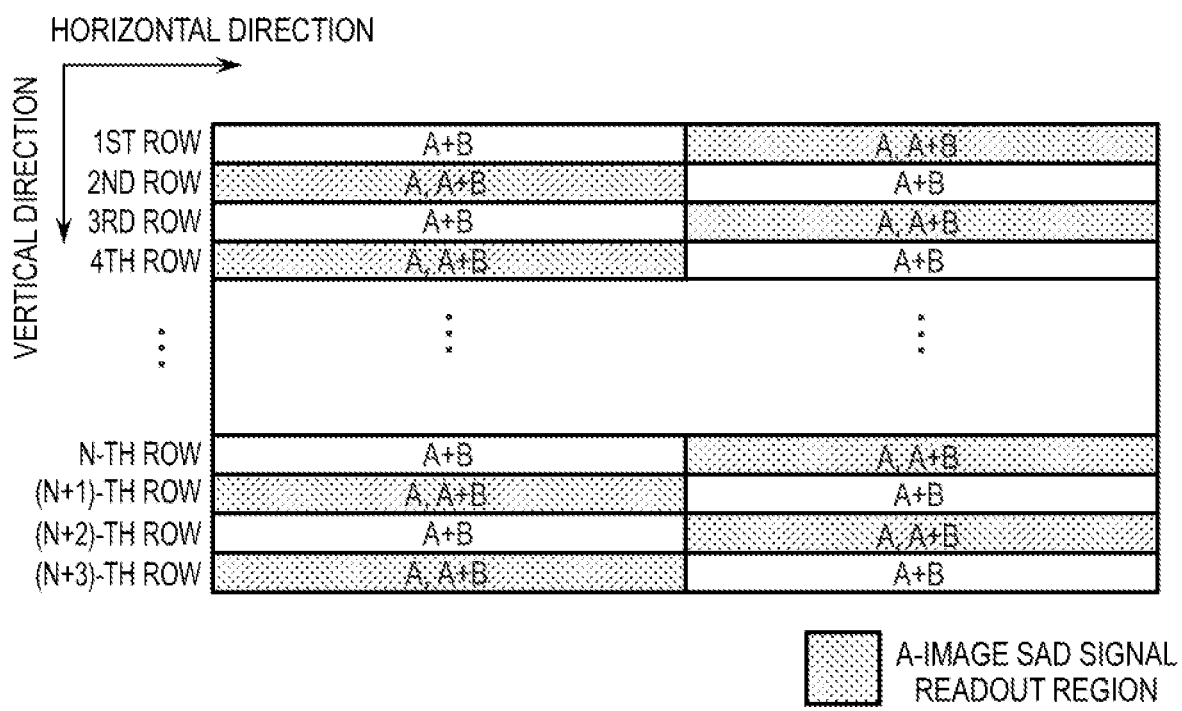

PHOTOELECTRIC CONVERSION DEVICE AND PHOTOELECTRIC CONVERSION SYSTEM

BACKGROUND

Field

The present disclosure relates to a photoelectric conversion device and a photoelectric conversion system.

Description of the Related Art

As a method for acquiring a distance to an object by using an imaging device for acquiring an image of the object, an imaging method called an image plane phase difference detection method is known. In the image plane phase difference detection method, the parallax of a pair of images formed by incident light passing through two different areas (partial pupils) in the exit pupil of the optical system of the camera is determined, and the distance to the object is measured from the parallax based on the principle of triangulation method. In a camera using the image plane phase difference detection method, each pixel of an imaging element includes two photoelectric converters corresponding to two partial pupils, for example. A signal obtained from an optical image formed by incident light on one photoelectric converter and a signal obtained from an optical image formed by incident light on two photoelectric converters are acquired by the pixel, and a signal for focus detection and a signal for image generation are generated from these signals.

Japanese Patent Application Laid-Open No. 2013-211833 discloses a method in which a region for reading out a signal based on charge generated by one photoelectric converter is made smaller than a region for reading out a signal based on charge generated by two photoelectric converters from the viewpoint of suppressing a decrease in a frame rate.

However, according to the method disclosed in Japanese Patent Application Laid-Open No. 2013-211833, since the region for reading out the signal based on charge generated by one photoelectric converter is defined by a part of rows and/or a part of columns, a signal for focus detection cannot be obtained over a plurality of rows including rows other than the part of rows.

SUMMARY

An object of the present disclosure is to provide a photoelectric conversion device capable of acquiring a signal for focus detection over a plurality of rows without lowering a frame rate.

According one aspect of the present disclosure, there is provided a photoelectric conversion device including a plurality of pixels arranged to form a plurality of rows and a plurality of columns, each of the plurality of pixels including a first photoelectric converter and a second photoelectric converter, a memory unit including a plurality of column memories each provided to corresponding one of the plurality of columns, each of the plurality of column memories being configured to hold a signal output from the pixel on the corresponding column, and a transfer unit configured to sequentially transfer the signals held in the memory unit to a processing unit in a subsequent stage on a column-by-column basis, wherein each of the plurality of pixels is configured to be capable of outputting at least one of a first signal based on a signal from the first photoelectric converter, and a second signal based on signals from the first photoelectric converter and the second photoelectric converter, wherein the number of the first signals output from the plurality of pixels is smaller than the number of the second signals output from the plurality of pixels, wherein a column at which a pixel arranged on a first row and outputting the first signal is arranged is different from a column at which a pixel arranged on a second row different from the first row and outputting the first signal is arranged, wherein the transfer unit is configured to perform on a row-by-row basis a first transfer period of transferring the first signal held in the memory unit and a second transfer period of transferring a plurality of second signals held in the memory unit, and wherein a column at which a pixel outputting the first signal to be transferred during the first period of the first row is arranged is different from a column at which a pixel outputting the first signal to be transferred during the first period of the second row is arranged.

Further features of the present disclosure will become apparent from the following description of exemplary embodiments with reference to the attached drawings.

BRIEF DESCRIPTION OF THE DRAWINGS

FIG. 5 is a schematic diagram illustrating readout positions of ranging signals and imaging signals in the photoelectric conversion device according to the first embodiment of the present disclosure (Part 1).

FIG. 6 is a schematic diagram illustrating readout positions of ranging signals and imaging signals in the photoelectric conversion device according to the first embodiment of the present disclosure (Part 2).

DESCRIPTION OF THE EMBODIMENTS

Preferred embodiments of the present disclosure will now be described in detail in accordance with the accompanying drawings.

First Embodiment

Figure 1:
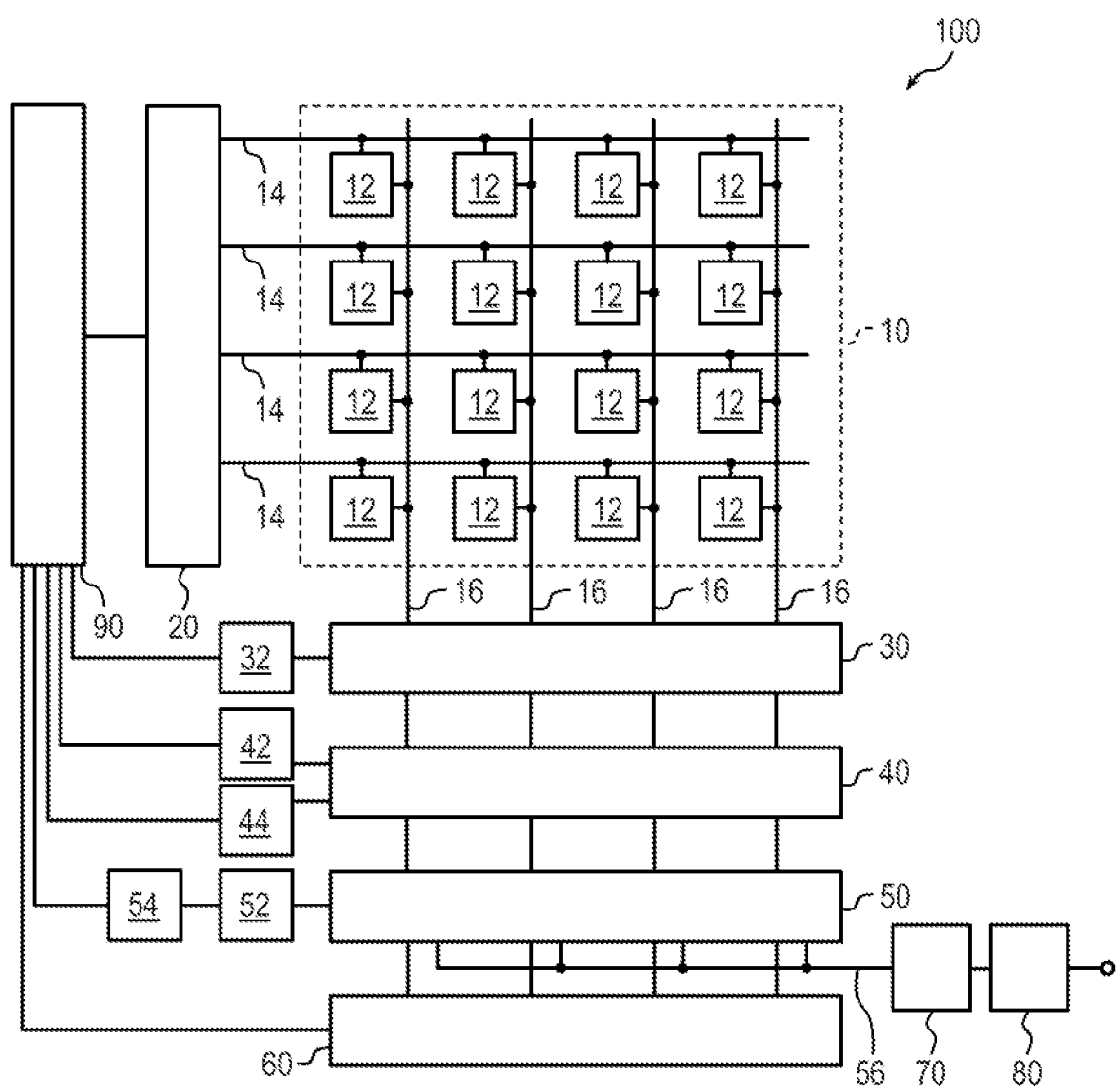
FIG. 1 is a block diagram illustrating a general configuration of a photoelectric conversion device according to a first embodiment of the present disclosure.
Figure 2:
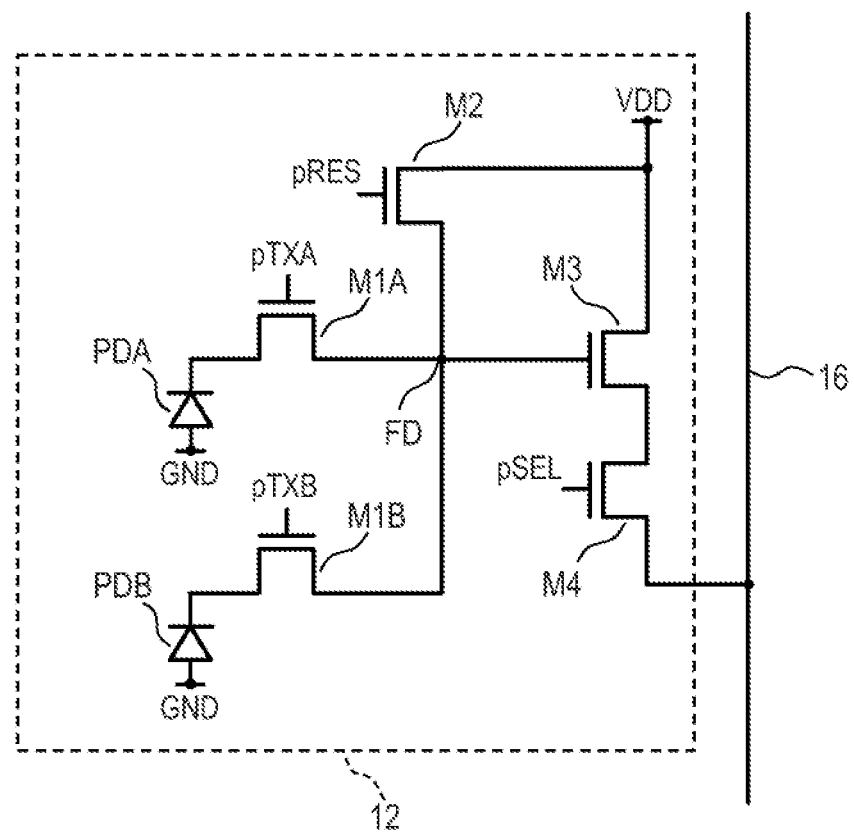
FIG. 2 is an equivalent circuit diagram illustrating a configuration example of a unit pixel in the photoelectric conversion device according to the first embodiment of the present disclosure.
Figure 3A:
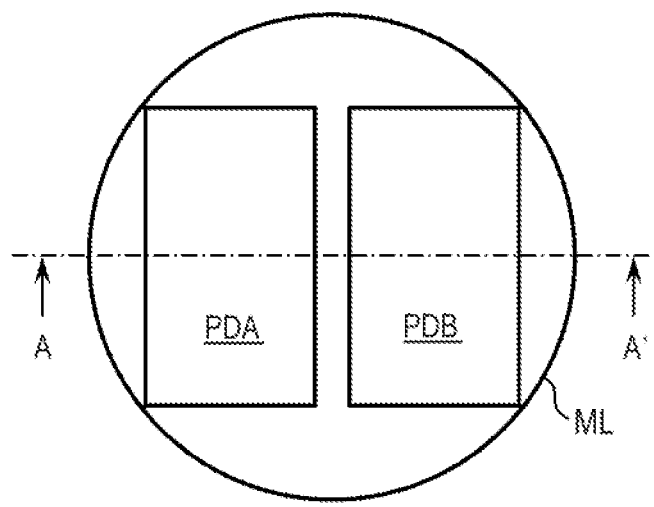
FIG. 3A and FIG. 3B are schematic diagrams illustrating an arrangement example of a plurality of photoelectric converters constituting one unit pixel.
Figure 3B:
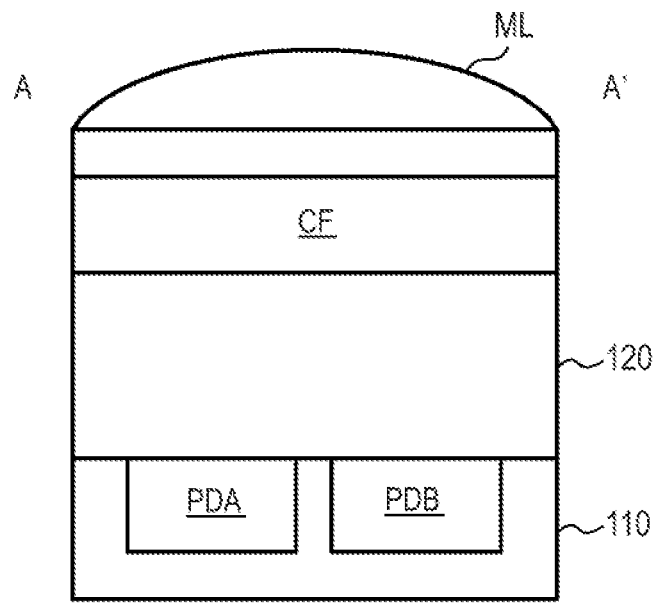

A photoelectric conversion device according to a first embodiment of the present disclosure will be described with reference to FIG. 1 to FIG. 3B. FIG. 1 is a block diagram illustrating a general configuration of a photoelectric conversion device according to the present embodiment. FIG. 2 is an equivalent circuit diagram illustrating a configuration example of a unit pixel in the photoelectric conversion device according to the present embodiment. FIG. 3A and FIG. 3B are schematic diagrams illustrating an arrangement example of a plurality of photoelectric converters constituting one unit pixel.

As illustrated in FIG. 1, a photoelectric conversion device 100 according to the present embodiment includes a pixel array unit 10, a vertical scanning circuit 20, a readout circuit unit 30, an AD conversion unit 40, a memory unit 50, a horizontal scanning circuit 60, a signal processing unit 70, and a signal output unit 80. The photoelectric conversion device 100 further includes pulse generation/reference bias circuit units 32, 44, a reference signal generator 42, a counter circuit 52, a PLL circuit 54, and a control unit 90.

The pixel array unit 10 is provided with a plurality of unit pixels 12 arranged in a matrix over a plurality of rows and a plurality of columns. In FIG. 1, among the unit pixels 12 constituting the pixel array unit 10, sixteen unit pixels 12 arranged in 4 rows×4 columns are illustrated, but the number of unit pixels 12 constituting the pixel array unit 10 is not particularly limited.

Each row of the pixel array unit 10 is provided with a control line 14 extending in a first direction (transverse direction in FIG. 1). Each of the control lines 14 is connected to the unit pixels 12 arranged in the first direction on the same row, and forms a common signal line to these unit pixels 12. The first direction in which the control line 14 extends may be referred to as a row direction or a horizontal direction. The control line 14 is connected to the vertical scanning circuit 20.

Each column of the pixel array unit 10 is provided with a vertical output line 16 extending in a second direction (longitudinal direction in FIG. 1) intersecting the first direction. Each of the vertical output lines 16 is connected to unit pixels 12 arranged in the second direction on the same column, and forms a common signal line to these unit pixels 12. The second direction in which the vertical output line 16 extends may be referred to as a column direction or a vertical direction. The vertical output line 16 is connected to the readout circuit unit 30.

The vertical scanning circuit 20 is a control circuit unit that, when reading out a signal from the unit pixels 12, supplies a control signal for driving a readout circuit in the unit pixel 12 to the unit pixels 12 via the control line 14 provided on each row of the pixel array unit 10. The vertical scanning circuit 20 may be configured using a shift register or an address decoder.

The readout circuit unit 30 includes a plurality of column readout circuits (not illustrated) provided corresponding to the vertical output lines 16 of each column. Each of the column readout circuits may include a current source load for supplying a bias current via the vertical output line 16 to the readout circuit in the unit pixel 12. Each of the column readout circuits may further include a column amplifier for amplifying the pixel signal read out via the vertical output line 16. The output of the column readout circuit of each column is connected to the AD conversion unit 40.

The pulse generation/reference bias circuit unit 32 is connected to the readout circuit unit 30. The pulse generation/reference bias circuit unit 32 may include a pulse circuit for generating a control signal for controlling the readout circuit unit 30 and a reference bias circuit for supplying a reference bias voltage to the readout circuit unit 30.

The AD conversion unit 40 includes a plurality of comparison circuits (not illustrated) provided corresponding to the column readout circuits of each column. Each of the comparison circuits compares the level of the pixel signal output from the column readout circuit of the corresponding column with the level of the reference signal, and outputs a signal corresponding to the result of the comparison to the memory unit 50. Specifically, the comparison circuit compares the level of the pixel signal with the level of the reference signal, and when the magnitude relation of these signals is inverted, the output signal is shifted from the high level to the low level or from the low level to the high level.

The reference signal generator 42 generates a reference signal for use in AD conversion and supplies the reference signal to the comparison circuit of each column of the AD conversion unit 40. The reference signal has predetermined amplitude corresponding to the range of the pixel signal, and may be a signal whose signal level changes with lapse of time. The reference signal is not particularly limited, but may be, for example, a ramp signal whose signal level monotonically increases or decreases with lapse of time. Note that the change in the signal level does not necessarily have to be continuous, but may be in a step shape.

The pulse generation/reference bias circuit unit 44 is connected to the AD conversion unit 40. The pulse generation/reference bias circuit unit 44 may include a pulse circuit for generating a control signal for controlling the AD conversion unit 40 and a reference bias circuit for supplying a reference bias voltage to the AD conversion unit 40.

The counter circuit 52 starts a count operation in synchronization with a timing at which a change in the signal level of the reference signal supplied from the reference signal generator 42 starts, and outputs a count signal indicating the count value to the memory unit 50 of each column. The PLL (Phase Locked Loop) circuit 54 generates a reference clock of the counter circuit 52.

The memory unit 50 includes a plurality of column memories (not illustrated) provided corresponding to the column AD conversion circuits of each column. The column memory of each column stores the count value indicated by the count signal output from the counter circuit 52 at the timing when the level of the output signal of the comparison circuit of the corresponding column is inverted, as digital data (digital pixel signal) of the pixel signal. The column memory of each column may include an N-memory for holding digital data of noise signals and an S-memory for holding digital data of light detection signals.

The horizontal scanning circuit 60 is a circuit unit that sequentially supplies control signals for outputting the digital pixel signals stored in the column memories of the respective columns to the column memories of the respective columns on a column-by-column basis. The control line of the horizontal scanning circuit 60 provided corresponding to each column is connected to the column memory of the corresponding column. When the column memory of each column receives the control signal via the control line of the corresponding column of the horizontal scanning circuit 60, the column memory of each column outputs the held digital pixel signal via the horizontal output line 56 to the signal processing unit 70. The horizontal scanning circuit 60 is a transfer unit that sequentially transfers the signals held in the memory unit 50 on a column-by-column basis to a processing unit (signal processing unit 70) in a subsequent stage.

The signal processing unit 70 (DFE: Digital Front End) is a circuit unit that performs predetermined signal processing on the digital pixel signal output from the memory unit 50 via the horizontal output line 56. Examples of the processing executed by the signal processing unit 70 include amplification processing and digital correlated double sampling (CDS) processing. The digital CDS processing is signal processing for performing the difference processing of (S−N) when the memory unit stores two kinds of digital data of the noise signal N and the light detection signal S as digital pixel signals.

The signal output unit 80 is a circuit unit for outputting the signal processed by the signal processing unit 70 to the outside of the photoelectric conversion device 100. The signal output unit 80 includes an external interface such as LVDS (Low Voltage Differential Signaling), and outputs a digital pixel signal after signal processing to the outside of the photoelectric conversion device 100.

The control unit 90 is a circuit unit for supplying control signals for controlling the operation and the timing thereof to the vertical scanning circuit 20, the pulse generation/reference bias circuit units 32, 44, the reference signal generator 42, the counter circuit 52, the PLL circuit 54, and the horizontal scanning circuit 60. At least a part of these control signals may be supplied from the outside of the photoelectric conversion device 100.

Unit pixel 12 may refer to the smallest unit of circuitry that is repeatedly arranged to form an image. As illustrated in, e.g., FIG. 2, each of the unit pixels 12 may include photoelectric converters PDA and PDB, transfer transistors M1A and M1B, reset transistor M2, amplifier transistor M3, and select transistor M4. Each of the unit pixels 12 may further include a capacitance addition transistor that adds capacitance to the floating diffusion portion FD. Typically, the select transistor M4 and a group of elements connected via the select transistor M4 to the vertical output line 16 constitute the unit pixel 12. That is, the select transistor may be the outer edge of the pixel circuit. The unit pixel 12 may include one microlens ML and a plurality of photoelectric converters PDA and PDB on which light passing through the microlens ML enters.

The photoelectric converters PDA and PDB are, for example, photodiodes. A photodiode constituting the photoelectric converter PDA has an anode connected to a ground node and a cathode connected to a source of the transfer transistor M1A. A photodiode constituting the photoelectric converter PDB has an anode connected to a ground node and a cathode connected to a source of the transfer transistor M1B. A drain of the transfer transistor M1A and a drain of the transfer transistor M1B are connected to a source of the reset transistor M2 and a gate of the amplifier transistor M3. The connection nodes of the drains of the transfer transistors M1A and M1B, the source of the reset transistor M2, and the gate of the amplifier transistor M3 are so-called floating diffusion portions FD. The floating diffusion portion FD includes a capacitance component (floating diffusion capacitance) and has a function as a charge holding portion.

A drain of the reset transistor M2 and a drain of the amplifier transistor M3 are connected to a power supply node (Voltage VDD). The source of the amplifier transistor M3 is connected to the drain of the select transistor M4. The source of the select transistor M4 is connected to the vertical output line 16.

In the case of the pixel configuration of FIG. 2, the control line 14 of each row arranged in the pixel array unit 10 includes four signal lines to which the control signals pTXA, pTXB, pRES, and pSEL from the vertical scanning circuit 20 are supplied. The signal line to which the control signal pTXA is supplied is connected to the gates of the transfer transistors M1A of the unit pixels 12 belonging to the corresponding row, and forms a common signal line for these unit pixels 12. The signal line to which the control signal pTXB is supplied is connected to the gates of the transfer transistors M1B of the unit pixels 12 belonging to the corresponding row, and forms a common signal line for these unit pixels 12. The signal line to which the control signal pRES is supplied is connected to the gates of the reset transistors M2 of the unit pixels 12 belonging to the corresponding row, and forms a common signal line for these unit pixels 12. The signal line to which the control signal pSEL is supplied is connected to the gates of the select transistors M4 of the unit pixels 12 belonging to the corresponding row, and forms a common signal line for these unit pixels 12. When each transistor constituting the unit pixel 12 is composed of an n-channel transistor, when the control signal of High level (hereinafter referred to as "H-level") is supplied from the vertical scanning circuit 20, the corresponding transistor is turned on. When the control signal of Low level (hereinafter referred to as "L-level") is supplied from the vertical scanning circuit 20, the corresponding transistor is turned off.

The photoelectric converters PDA and PDB convert (photoelectrically convert) the incident light into charge of an amount corresponding to the quantity of light and accumulate the generated charge. When the transfer transistor M1A is turned on, the transfer transistor M1A transfers the charge held by the photoelectric converter PDA to the floating diffusion portion FD. When the transfer transistor M1B is turned on, the transfer transistor M1B transfers the charge held by the photoelectric converter PDB to the floating diffusion portion FD. The floating diffusion portion FD holds the charge transferred from the photoelectric converters PDA and PDB, and the floating diffusion portion FD becomes a voltage corresponding to the amount of the charge transferred from the photoelectric converters PDA and PDB by the charge-voltage conversion by the capacitance component. The amplifier transistor M3 has a configuration in which a power supply voltage is supplied to the drain and a bias current is supplied to the source via the vertical output line 16 and the select transistor M4 from the readout circuit unit 30, and constitutes an amplification unit (source follower circuit) having a gate as an input node. As a result, the amplifier transistor M3 outputs a signal corresponding to the voltage of the floating diffusion portion FD to the vertical output line 16 via the select transistor M4. When the reset transistor M2 is turned on, the reset transistor M2 resets the floating diffusion portion FD to a voltage corresponding to the power supply voltage. The select transistor M4 is a switch for selecting the unit pixel 12, and the select transistor M4 connects the amplifier transistor M3 to the vertical output line 16 when the select transistor M4 is turned on.

As described above, the transfer transistors M1A and M1B, the reset transistor M2, and the select transistor M4 of the unit pixel 12 are controlled on a row-by-row basis by the control signals pTXA, pTXB, pRES, and pSEL supplied from the vertical scanning circuit 20. The pixel signals of the unit pixels 12 belonging to the row selected by the control signal pSEL are simultaneously output to the corresponding vertical output lines 16 of the respective unit pixels 12. The pixel signals output from the unit pixels 12 are an analog signal.

In this specification, a signal based on charge generated by the photoelectric converter PDA is referred to as "A-image signal" and a signal based on charge generated by the photoelectric converter PDB is referred to as "B-image signal". A signal based on the total charge generated by the photoelectric converters PDA and PDB is referred to as "(A+B)-image signal". Each of the unit pixels 12 is configured to output at least one of the A-image signal and the (A+B)-image signal.

FIG. 3A and FIG. 3B are schematic diagrams illustrating an arrangement example of the photoelectric converter PDA and the photoelectric converter PDB constituting one unit pixel 12. FIG. 3A is a top view and FIG. 3B is a cross-sectional view taken along line A-A' in FIG. 3A.

The photoelectric converters PDA and PDB are provided together with transistors (not illustrated) constituting the unit pixel 12 in the semiconductor layer 110. Above the semiconductor layer 110, a microlens ML are arranged with an insulating layer 120, a color filter layer CF, etc. interposed there between. As illustrated in FIG. 3A and FIG. 3B, the photoelectric converter PDA and the photoelectric converter PDB constituting one unit pixel 12 share one microlens ML. In other words, the photoelectric converter PDA and the photoelectric converter PDB are configured to receive light passing through pupil regions different from each other among light entering an imaging optical system. With this configuration, the signal (A-image signal) based on the charge generated by the photoelectric converter PDA and the signal (B-image signal) based on the charge generated by the photoelectric converter PDB can be used as a phase difference detection signal for distance measurement. The signal ((A+B)-image signal) based on the total charge generated by the photoelectric converters PDA and PDB can be used as a signal for image generation.

Next, a method of driving the photoelectric conversion device according to the present embodiment will be described with reference to FIG. 4 to FIG. 7.

Figure 4:
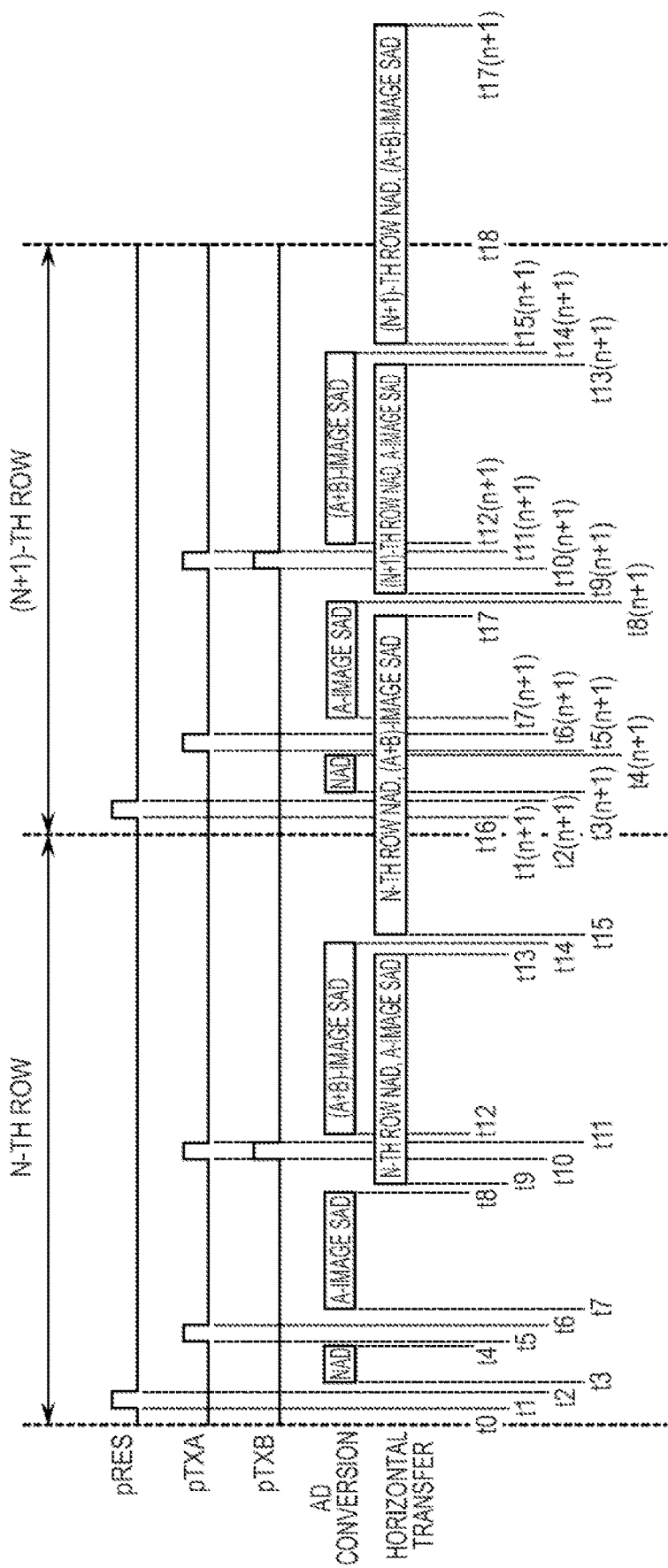
FIG. 4 is a timing diagram illustrating a method of driving a photoelectric conversion device according to the first embodiment of the present disclosure.

FIG. 4 is a timing diagram illustrating a driving example of the unit pixels 12 on the N-th row and the unit pixels 12 on the (N+1)-th row of the unit pixels 12 constituting the pixel array unit 10. FIG. 4 illustrates control signals pRES, pTXA, and pTXB of corresponding rows among the control signals supplied from the vertical scanning circuit 20. FIG. 4 illustrates an AD conversion period of the pixel signal and a horizontal transfer period from the memory unit 50 to the signal processing unit 70.

In FIG. 4, "NAD" indicates an AD conversion period of the noise signal. "A-image SAD" indicates an AD conversion period of the A-image signal. "(A+B)-image SAD" indicates an AD conversion period of the (A+B)-image signal. "N-th Row NAD, A-Image SAD" indicates a horizontal transfer period of the digital data of the noise signal and the A-image signal of the unit pixels 12 on the N-th row. "N-th Row NAD, (A+B)-image SAD" indicates the horizontal transfer period of the digital data of the noise signal and the (A+B)-image signal of the unit pixels 12 on the N-th row. "(N+1)-th Row NAD, A-Image SAD" indicates the horizontal transfer period of the digital data of the noise signal and the A-image signal of the unit pixels 12 on the (N+1)-th row. "(N+1)-th Row NAD, (A+B)-Image SAD" indicates a horizontal transfer period of the digital data of the noise signal and the (A+B)-image signal of the unit pixels 12 on the (N+1)-th row.

In FIG. 4, a period from time t1 to time t16 is a readout period of the pixel signals from the unit pixels 12 on the N-th row, and a period from time t16 to time t18 is a readout period of the pixel signal from the unit pixels 12 on the (N+1)-th row. Since the readout operation of the (N+1)-th row is basically the same as the readout operation of the N-th row, the time in the readout period of the (N+1) row is distinguished by adding the sign (n+1) to the time in the readout period of the N-th row.

In the period before time t0, the control signals pRES, pTXA, pTXB, and pSEL supplied from the vertical scanning circuit 20 to the unit pixels 12 on the N-th row and the unit pixels 12 on the (N+1)-th row are assumed to be at the L-level.

During the period from time t0 to time t16, the vertical scanning circuit 20 controls the control signal pSEL (not illustrated) supplied to the unit pixels 12 on the N-th row to the H-level. As a result, the select transistors M4 of the unit pixels 12 on the N-th row are turned on, and the unit pixels 12 on the N-th row are selected. That is, the pixel array unit 10 is in a state capable of outputting the pixel signals of the unit pixels 12 on the N-th row to the vertical output lines 16.

During the period from time t1 to time t2, the vertical scanning circuit 20 controls the control signal pRES supplied to the unit pixels 12 on the N-th row to the H-level. Thus, the reset transistors M2 of the unit pixels 12 on the N-th row are turned on, and the floating diffusion portions FD of the unit pixels 12 on the N-th row are reset to the potential corresponding to the voltage VDD.

At time t2, as the control signal pRES changes to the L-level, the reset transistors M2 of the unit pixels 12 on the N-th row are turned off, and the floating diffusion portions FD of the unit pixels 12 on the N-th row are brought into a floating state. Each of the amplifier transistors M3 of the unit pixels 12 on the N-th row outputs a signal (noise signal) corresponding to the potential of the floating diffusion portion FD at this time to the corresponding vertical output line 16 via the select transistor M4.

During the period from time t3 to time t4, the AD conversion unit 40 performs AD conversion on the noise signal received from the unit pixel 12 via the vertical output line 16 and the readout circuit unit 30. Digital data obtained by performing AD conversion on the noise signal is held in the memory unit 50. Hereinafter, the period for performing AD conversion on the noise signal is referred to as "NAD period" and the digital data obtained by performing AD conversion on the noise signal is referred to as "NAD signal".

During the period from time t5 to time t6, the vertical scanning circuit 20 controls the control signal pTXA supplied to the unit pixels 12 on the N-th row to the H-level. As a result, the transfer transistors M1A of the unit pixels 12 on the N-th row are turned on, and the charge stored in the photoelectric converter PDA during the exposure period in each of the unit pixels 12 on the N-th row is transferred to the floating diffusion portion FD. The floating diffusion portion FD becomes a potential corresponding to the amount of charge transferred from the photoelectric converter PDA.

At time t6, as the control signal pTXA changes to the L-level, the transfer transistors M1A of the unit pixels 12 on the N-th row are turned off, and the floating diffusion portion FD of each of the unit pixels 12 on the N-th row is brought into the floating state. Each of the amplifier transistors M3 of the unit pixels 12 on the N-th row outputs a signal (A-image signal) corresponding to the potential of the floating diffusion portion FD at this time to the corresponding vertical output line 16 via the select transistor M4.

During the period from time t7 to time t8, the AD conversion unit 40 performs A/D conversion of the A-image signal received from the unit pixel 12 via the vertical output line 16 and the readout circuit unit 30. The digital data obtained by performing AD conversion on the A-image signal is held in the memory unit 50. Hereinafter, the period for performing AD conversion on the A-image signal is referred to as "A-image SAD period" and the digital data obtained by performing AD conversion on the A-image signal is referred to as "A-image SAD signal". The A-image SAD signal is a signal for focus detection.

During the period from time t9 to time t13, the memory unit 50 sequentially transfers the NAD signal and the A-image SAD signal held by the column memory of each column to the signal processing unit 70 in accordance with the control signal from the horizontal scanning circuit 60. Although the details of the memory unit 50 are not described here, the column memory of each column may simultaneously hold the NAD signal and the SAD signal, and may hold a new signal after transferring these signals to the signal processing unit 70. That is, at least a part of the transfer period of the NAD signal and the SAD signal may be performed in parallel with the (A+B)-image SAD period described later.

During the period from time t10 to time t11, the vertical scanning circuit 20 controls the control signals pTXA and pTXB supplied to the unit pixels 12 on the N-th row to the H-level. As a result, the transfer transistors M1A and M1B of the unit pixels 12 on the N-th row are turned on, and the charges accumulated in the photoelectric converters PDA and PDB during the exposure period in each of the unit pixels 12 on the N-th row are transferred to the floating diffusion portion FD. The floating diffusion portion FD becomes a potential corresponding to the amount of charge transferred from the photoelectric converters PDA and PDB.

At time t11, as the control signals pTXA and pTXB transition to the L-level, the transfer transistors M1A and M1B of the unit pixels 12 on the N-th row are turned off, and the floating diffusion portion FD of each of the unit pixels 12 on the N-th row is brought into the floating state. Each of the amplifier transistor M3 of the unit pixels 12 on the N-th row outputs a signal ((A+B)-image signal) corresponding to the potential of the floating diffusion portion FD at this time to the corresponding vertical output line 16 via the select transistor M4.

During the period from time t12 to the time t14, the AD conversion unit 40 performs AD conversion on the (A+B)-image signal received from the unit pixel 12 via the vertical output line 16 and the readout circuit unit 30. The digital data obtained by performing AD conversion on the (A+B)-image signal is held in the memory unit 50. Hereinafter, the period for performing AD conversion on the (A+B)-image signal is referred to as "(A+B)-image SAD period" and the digital data obtained by performing AD conversion on the (A+B)-image signal is referred to as "(A+B)-image SAD signal". The (A+B)-image SAD signal is a signal for image generation.

During the period from time t15 to time t17, the memory unit 50 sequentially transfers the NAD signal and the (A+B)-image SAD signal held by the column memory of each column to the signal processing unit 70 in accordance with the control signal from the horizontal scanning circuit 60.

At time t16, the vertical scanning circuit 20 controls the control signal pSEL (not illustrated) supplied to the unit pixels 12 on the N-th row to the L-level. Thus, the select transistors M4 of the unit pixels 12 on the N-th row are turned off, and the selection of the unit pixels 12 on the N-th row are released.

Next, during the period from time t16 to time t18, the vertical scanning circuit 20 controls the control signal pSEL (not illustrated) supplied to the unit pixels 12 on the (N+1)-th row to the H-level. As a result, the select transistors M4 of the unit pixels 12 on the (N+1)-th row are turned on, and the unit pixels 12 on the (N+1)-th row are selected. That is, the pixel array unit 10 is in a state capable of outputting the pixel signals of the unit pixels 12 on the (N+1)-th row to the vertical output lines 16.

The readout operation of the (N+1)-th row from time t16 to time t18 is basically the same as the readout operation of the N-th row from time t0 to time t16, and the description thereof is omitted here.

In the driving example described above, the horizontal transfer of the (A+B)-image SAD signals, which are the imaging signal, to the signal processing unit 70 starts at time t15. Therefore, the horizontal transfer of the A-image SAD signals, which are the ranging signal, to the signal processing unit 70 must be completed before time t15. When pixel signals are readout from all the unit pixels 12 arranged in the same row, the time required for horizontal transfer from the memory unit 50 to the signal processing unit 70 is at least the same as the time period from time t15 to time t17. Therefore, when the A-image SAD signal is read out from all the unit pixels 12 arranged in the same row, the length of the period from time t9 to time t13 becomes the same as the length of the period from time t15 to time t17.

Due to the configuration of the memory unit 50, the time t17 cannot exceed the time t9 (n+1) at which the horizontal transfer of the A-image SAD signals of the unit pixel 12 on the (N+1)-th row are started. Therefore, if more A-image SAD signals are to be obtained to perform distance measurement over the entire screen, the length of the period from time t9 to time t13 is extended, and the time t15 at which the horizontal transfer of the (A+B)-image SAD signal is started is delayed. Accordingly, the time t9 (n+1) at which the horizontal transfer of the A-image SAD signals of the unit pixels 12 on the (N+1)-th row are started is also delayed.

Therefore, if an attempt is made to read out the A-image SAD signals from all the unit pixels 12 arranged in the same row, the time required to obtain pixel signals for one row is prolonged, and the frame rate is lowered. On the other hand, in order to avoid a decrease in the frame rate, as described in Japanese Patent Application Laid-Open No. 2013-211833, when the A-image SAD signals are read out only from a part of the unit pixels 12 arranged in a specific region, distance measurement cannot be performed over a plurality of rows including regions other than the specific region.

From such a viewpoint, in the present embodiment, the unit pixels 12 for reading out the A-image SAD signal are driven to change on a row-by-row basis. By driving the photoelectric conversion device in this manner, it is possible to read out the A-image SAD signals that cover the entire screen area while suppressing a decrease in the frame rate.

Figure 7:
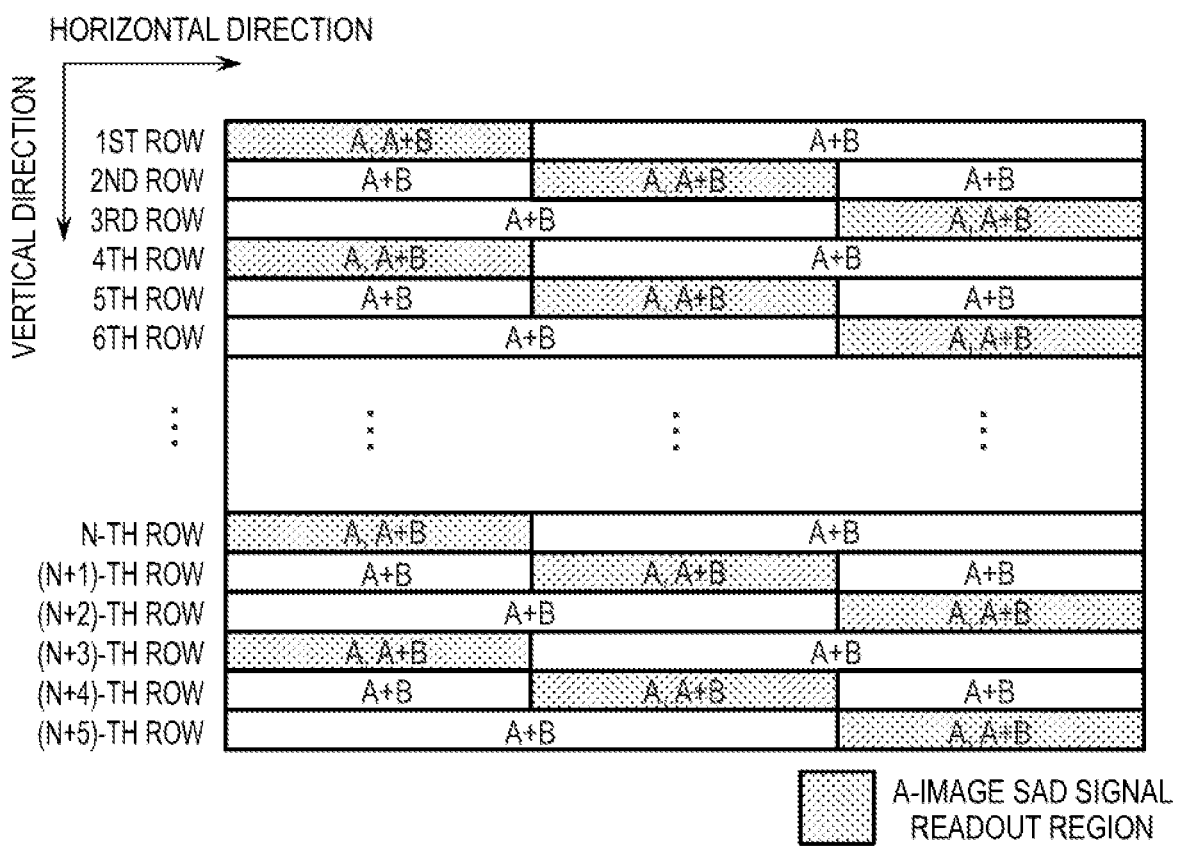
FIG. 7 is a schematic diagram illustrating readout positions of ranging signals and imaging signals in the photoelectric conversion device according to the first embodiment of the present disclosure (Part 3).

FIG. 5 to FIG. 7 are schematic views illustrating an arrangement example of the unit pixels 12 for reading out the A-image SAD signal. In the drawing, "A+B" indicates an area for reading out only the (A+B)-image SAD signals, and "A, A+B" indicates an area for reading out the A-image SAD signals and the (A+B)-image SAD signals.

FIG. 5 illustrates an arrangement example in which the pixel array unit 10 is divided into two column blocks in the horizontal direction, and the area for reading out the A-image SAD signals is switched for each row. In this example, the A-image SAD signals are read out from the left column block in the horizontal direction in odd rows, and the A-image SAD signal is read out from the right column block in the horizontal direction in even rows. The (A+B)-image SAD signals are read out from all column blocks in both odd and even rows.

In other words, the number of A-image SAD signals transferred during the horizontal transfer period of the A-image SAD signals is smaller than the number of (A+B)-image SAD signals transferred during the horizontal transfer period of the (A+B)-image SAD signals. Further, the columns in which the unit pixels 12 for outputting the A-image SAD signal transferred during the horizontal transfer period of the A-image SAD signals on the odd rows are arranged and the column in which the unit pixels 12 for outputting the A-image SAD signals transferred during the horizontal transfer period of the A-image SAD signals on the even rows are arranged are different from each other. The plurality of rows constituting the pixel array unit 10 are constituted by periodically arranging row blocks each including a row for outputting an A-image SAD signal from the left column block and a row for outputting an A-image SAD signal from the right column block.

In this arrangement example, when a particular row is focused on, the ranging signals are acquired only from a part of the area in the horizontal direction, but when a plurality of rows are focused on, the ranging signals are acquired from the entire area in the horizontal direction. Although the resolution of the ranging signal in the vertical direction is low when viewed on the entire screen, the ranging signal covering the entire screen may be acquired.

In order to improve the S/N ratio of the ranging signal, the A-image SAD signals from the unit pixels 12 on adjacent odd-numbered rows of the same column may be added, and the A-image SAD signals from the unit pixels 12 on adjacent even-numbered rows of the same column may be added. For example, when the A-image SAD signals of two rows are added, the S/N ratio increases to $\sqrt{2}$ times because the signal is doubled while the noise is $\sqrt{2}$ times. In addition processing of the pixel signals, improvement of AF accuracy under low illuminance conditions may be expected. The number of rows to be added is not limited to two but may be three or more. The addition processing of the A-image SAD signal is not particularly limited, but may be performed, for example, in the signal processing unit 70 or in a signal processing apparatus external to the photoelectric conversion device 100.

In the arrangement example of FIG. 5, the A-image SAD signal is acquired from each column one time by driving two adjacent rows, but a column outputting the A-image SAD signal two times may be provided in at least a part of the column. Further, there may be at least a part of a row which does not output the A-image SAD signal. The same applies to the arrangement examples of FIG. 6 and FIG. 7 described later.

FIG. 6 is an arrangement example in which the operation of odd rows and the operation of even rows in FIG. 5 are interchanged. That is, in this example, the A-image SAD signals are read out from the right column block in the horizontal direction in odd rows, and the A-image SAD signals are read out from the left column block in the horizontal direction in even rows.

Either one of the arrangement example illustrated in FIG. 5 and the arrangement example illustrated in FIG. 6 may be adopted for all the frames or may be switched in units of frames. For example, the arrangement example of FIG. 5 and the arrangement example of FIG. 6 may be alternately adopted for each frame, such as reading out the pixel signals in accordance with the arrangement example of FIG. 5 in the N-th frame and reading out the pixel signals in accordance with the arrangement example of FIG. 6 in the (N+1)-th frame. By changing the column block in which the A-image SAD signals are read out for each frame, it is also possible to interpolate the A-image SAD signals of the column block which is not read out in a certain frame from the A-image SAD signals of the column block which are read out in the frames before and after the certain frame. The switching of the column blocks for reading out the A-image SAD signal is not necessarily performed for every frame, but may be performed for every two or more predetermined number of frames.

In the arrangement examples of FIG. 5 and FIG. 6, the pixel array unit 10 is divided into two column blocks in the horizontal direction, and the area for reading out the A-image SAD signals is switched for each row, but the number of divisions in the horizontal direction is not limited to two. The number of divisions in the horizontal direction may be appropriately set so as to obtain a desired frame rate.

For example, as illustrated in FIG. 7, the pixel array unit 10 may be divided into three portions in the horizontal direction, and a region for reading out the A-image SAD signals may be switched for each row. In the arrangement example of FIG. 7, the unit pixels 12 of each row are divided into 3 regions in the horizontal direction, and A-image SAD signals are acquired from one region of the three regions. By switching the area for acquiring the A-image SAD signals in three row cycles, it is possible to read out the A-image SAD signals covering the entire screen area.

In the arrangement example of FIG. 7, the number of A-image SAD signals read out from the unit pixels 12 on one row is ⅓ as compared with the case where the A-image SAD signals are read out from all the unit pixels 12 on one row. Therefore, the transfer time (length of time period from time t9 to time t13) of the A-image SAD signals from the memory unit 50 to the signal processing unit 70 may be set to ⅓. As a result, the frame rate may be further improved as compared with the case of FIG. 5 and FIG. 6.

As the phase difference detection signal for distance measurement, a B-image SAD signal is used in addition to the A-image SAD signal. The B-image SAD signal may be calculated by subtracting the A-image SAD signal from the (A+B)-image SAD signal. The generation of the B-image SAD signal may be performed by the signal processing unit 70 or may be performed by a signal processing unit external to the photoelectric conversion device 100.

As described above, according to the present embodiment, it is possible to acquire a signal for focus detection over a plurality of rows without lowering the frame rate.

Second Embodiment

A photoelectric conversion device according to a second embodiment of the present disclosure will be described with reference to FIG. 8. The same components as those of the photoelectric conversion device according to the first embodiment are denoted by the same reference numerals, and descriptions thereof will be omitted or simplified.

Figure 8:
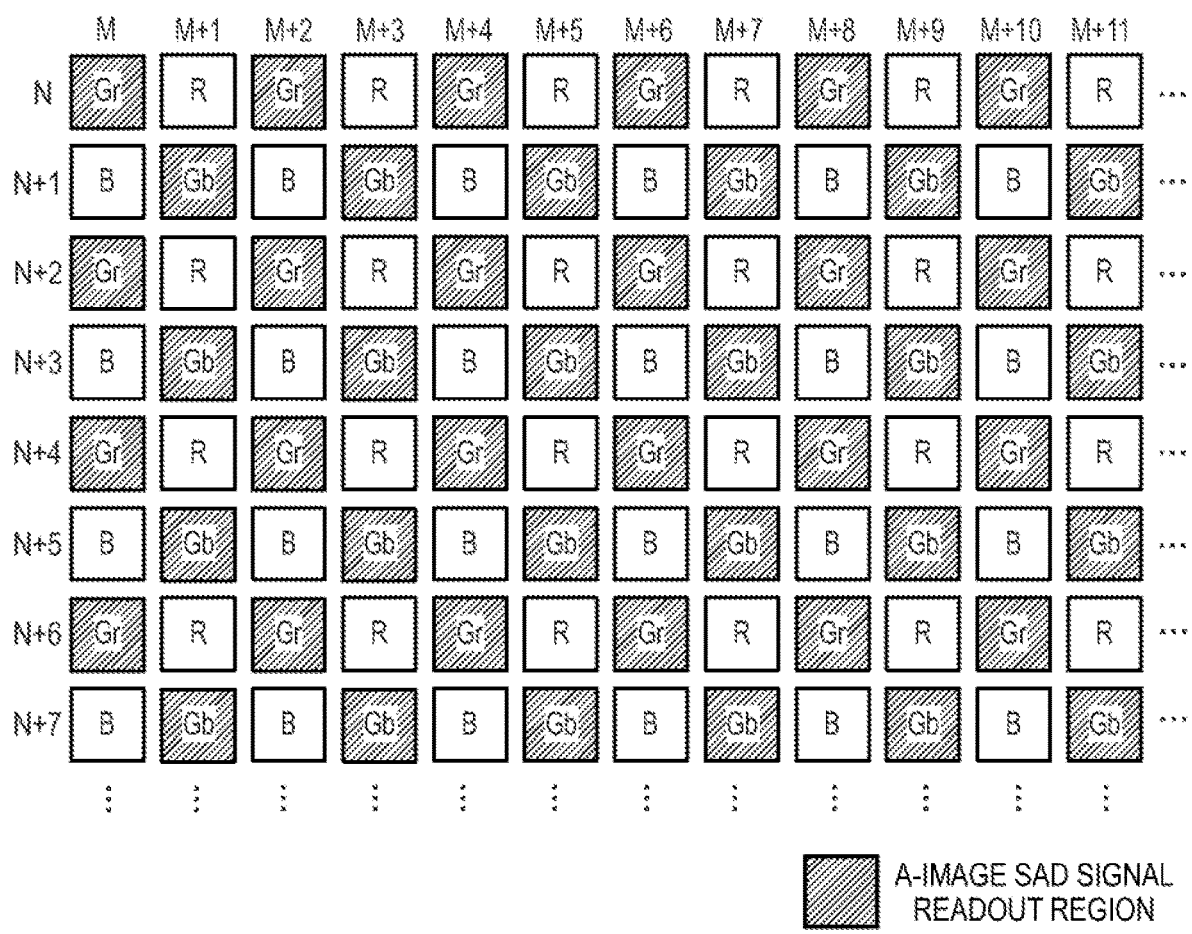
FIG. 8 is a schematic diagram illustrating readout positions of ranging signals and imaging signals in the photoelectric conversion device according to a second embodiment of the present disclosure.

FIG. 8 is a diagram illustrating an example of a color filter arrangement of the pixel array unit in the photoelectric conversion device according to the present embodiment. FIG. 8 illustrates a color filter arrangement corresponding to a unit pixel array of eight rows by twelve columns from N-th row and M-th column to (N+7)-th row and (M+11)-th column, out of the plurality of unit pixels 12 arranged in the pixel array unit 10.

Each of the unit pixels 12 arranged in the pixel array unit 10 includes a color filter having a predetermined spectral sensitivity characteristic. FIG. 8 illustrates an example in which a plurality of unit pixels 12 are arranged according to a Bayer arrangement which is one of arrangements of the color patterns of the color filter. In the Bayer arrangement, pixels (G pixels) having a green color filter, pixels (R-pixels) having a red color filter, and pixels (B pixels) having a blue color filter are arranged at a ratio of 2:1:1. A unit pixel block of two rows×two columns in which two G pixels are arranged at one diagonal position and R and B pixels are arranged at the other diagonal position is a minimum repeating unit of the Bayer arrangement. Here, the R pixel is a pixel having sensitivity to light in a red wavelength range, the G pixel is a pixel having sensitivity to light in a green wavelength range, and the B pixel is a pixel having sensitivity to light in a blue wavelength range. In this specification, the term "having sensitivity" means that the peak wavelength of light incident on the photoelectric converter is in the wavelength range of the corresponding color. In general, the spectral sensitivity of these color pixels is higher in the order of G pixel, R pixel, and B pixel.

In the Bayer arrangement, the row in which R pixels and G pixels are alternately arranged and the row in which G pixels and B pixels are alternately arranged are alternately arranged. For the sake of convenience, G pixels arranged on the same row as R pixels ("R" in the figure) are denoted as Gr pixels ("Gr" in the figure), and G pixels arranged on the same row as B pixels ("B" in the figure) are denoted as Gb pixels ("Gb" in the figure).

In the present embodiment, the A-image SAD signal and the (A+B)-image SAD signal are read out from the Gr pixel and the Gb pixel, and the (A+B)-image SAD signal is read out from the R pixel and the B pixel, but the A-image SAD signal is not read out from the R pixel and the B pixel. Since the color filter arrangement of FIG. 8 includes rows in which R pixels and Gr pixels are alternately arranged and rows in which Gb pixels and B pixels are alternately arranged, the A-image SAD signals are thinned to ½ in each row. Therefore, in the horizontal transfer operation of each row, the length of the period for transferring the A-image SAD signal from the memory unit 50 to the signal processing unit 70 may be reduced to half the length of the period for transferring the (A+B)-image SAD signal from the memory unit 50 to the signal processing unit 70. As a result, the frame rate may be improved as compared with the case where the A-image SAD signal is read out from all the unit pixels 12.

In the Bayer arrangement, columns including Gr pixels and columns including Gb pixels are alternately arranged. Therefore, for example, by Gr pixels arranged in odd rows and Gb pixels arranged in even rows, the regions for distance measurement may cover the entire region in the horizontal direction. Thus, the A-image SAD signal covering the entire screen area may be read out. Since the ratio of the G pixels is higher than that of the R pixels and the B pixels in the Bayer arrangement, the resolution of the A-image SAD signal may be increased as compared with the case where the A-image SAD signals are acquired from the R pixels or B pixels.

In order to improve the S/N ratio of the ranging signal, the A-image SAD signal may be added to each of the predetermined number of the unit pixels 12. For example, the A-image SAD signal of the Gr pixel and the A-image SAD signal of the Gb pixel constituting one unit pixel block of the Bayer arrangement may be added. Since the Gr pixel and the Gb pixel are pixels of the same color, these A-image SAD signals may be added. Alternatively, the A-image SAD signals of two or more Gr pixels arranged in the same row and the A-image SAD signals of two or more Gb pixels arranged in the same row may be respectively added. Alternatively, the A-image SAD signals of two or more Gr pixels arranged in the same column and the A-image SAD signals of two or more Gb pixels arranged in the same column may be respectively added.

As described above, according to the present embodiment, it is possible to acquire a signal for focus detection over a plurality of rows without lowering the frame rate.

Third Embodiment

A photoelectric conversion device according to a third embodiment of the present disclosure will be described with reference to FIG. 9. The same components as those of the photoelectric conversion device according to the first and second embodiments are denoted by the same reference numerals, and the descriptions thereof will be omitted or simplified.

Figure 9:
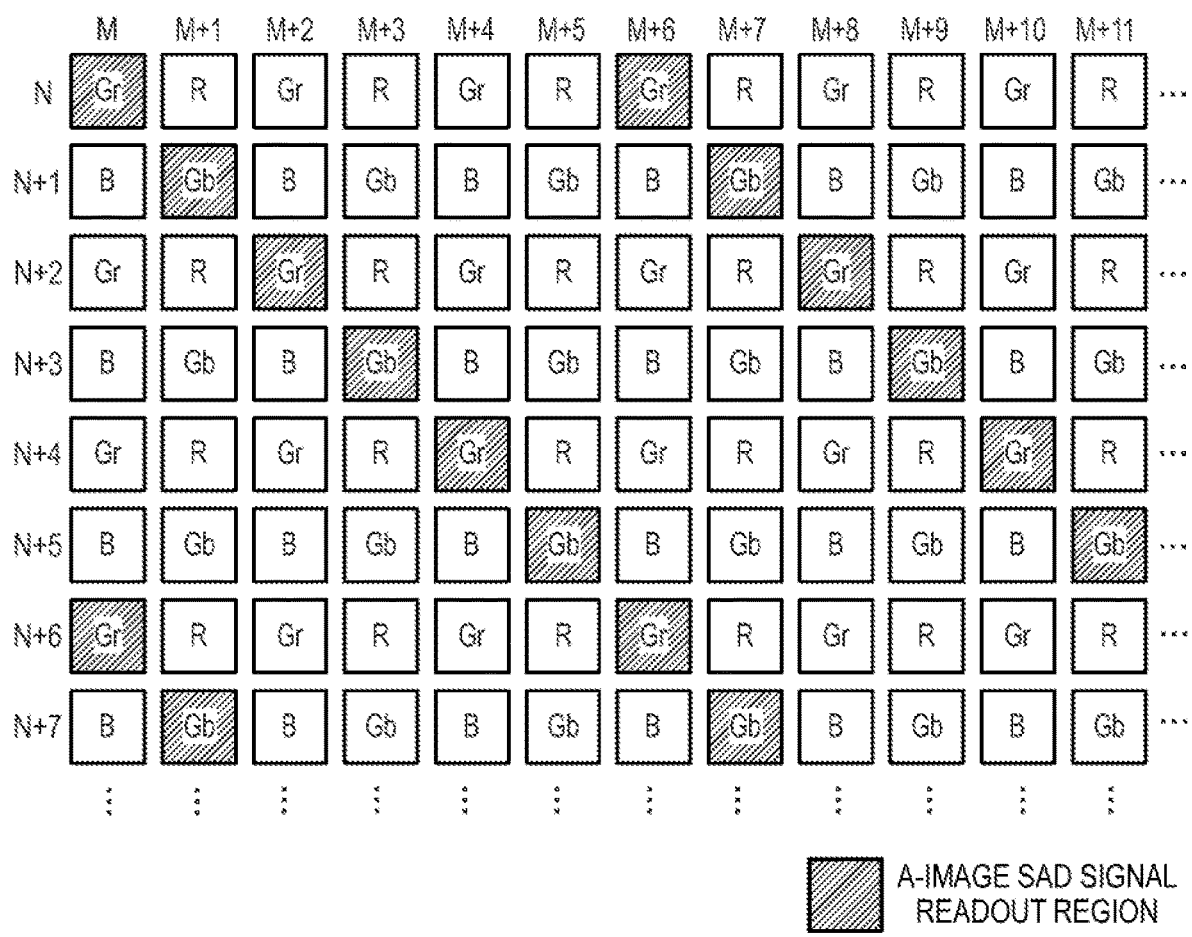
FIG. 9 is a schematic diagram illustrating readout positions of ranging signals and imaging signals in the photoelectric conversion device according to a third embodiment of the present disclosure.

FIG. 9 is a diagram illustrating an example of a color filter arrangement of the pixel array unit in the photoelectric conversion device according to the present embodiment. FIG. 9 illustrates a color filter arrangement corresponding to a unit pixel array of eight rows by twelve columns from N-th row and M-th column to (N+7)-th row and (M+11)-th column, out of the plurality of unit pixels 12 arranged in the pixel array unit 10.

Similar to the second embodiment, the photoelectric conversion device according to the present embodiment has a plurality of unit pixels 12 arranged in a Bayer arrangement. In the second embodiment, the A-image SAD signals are read out from all the G pixels, but in the present embodiment, the A-image SAD signals are read out from the G pixels as well, but the G pixels for reading out the A-image SAD signals are thinned to ⅓. Since the Bayer arrangement includes rows in which R pixels and Gr pixels are alternately arranged and rows in which Gb pixels and B pixels are alternately arranged, the A-image SAD signal is thinned to ⅙ in each row.

Specifically, a unit pixel array of 6 rows×6 columns from N-th row and M-th column to (N+5)-th row and (M+5)-th column is defined as a unit pixel block, the A-image SAD signals and the (A+B)-image SAD signals are read out from the G pixels located on one diagonal of the unit pixel block. The (A+B)-image SAD signal is read out from the other G pixels, R pixels and B pixels, but the A-image SAD signal is not read out from these pixels. By repeatedly arranging the unit pixel blocks in the row direction and column direction, a pixel array unit 10 is constituted.

Focusing on the M-th column, a pixel which the A-image SAD signal is next read out after reading out the A-image SAD signal of the Gr pixel on the N-th row is the Gr pixel on the (N+6)-th row. Focusing on the N-th rows, a pixel which the A-image SAD signal is next read out after reading out the A-image SAD signal of the Gr pixel on the M-th column is the Gr pixel on the (M+6)-th column. Thus, in this readout pattern, the A-image SAD signal is thinned to ⅙ in both the horizontal and vertical directions. Therefore, in the transfer operation of each row, the length of the period for transferring the A-image SAD signal from the memory unit 50 to the signal processing unit 70 may be reduced to ⅙ of the length of the period for transferring the (A+B)-image SAD signal from the memory unit 50 to the signal processing unit 70. As a result, the frame rate may be improved as compared with the case where the A-image SAD signal is read out from all the unit pixels 12.

The higher the thinning out ratio of the A-image SAD signal, the transfer time of the A-image SAD signal may be reduced. The thinning out ratio of the A-image SAD signal may be appropriately set so that time t13 at which the transfer of the A-image SAD signal is completed does not exceed the (A+B)-image SAD period from time t12 to time t14 in FIG. 4.

In the present embodiment, similarly to the first and second embodiments, in order to improve the S/N ratio of the ranging signal, the A-image SAD signal may be added to each of the predetermined number of unit pixels 12.

As described above, according to the present embodiment, it is possible to acquire a signal for focus detection over a plurality of rows without lowering the frame rate.

Fourth Embodiment

Figure 10:
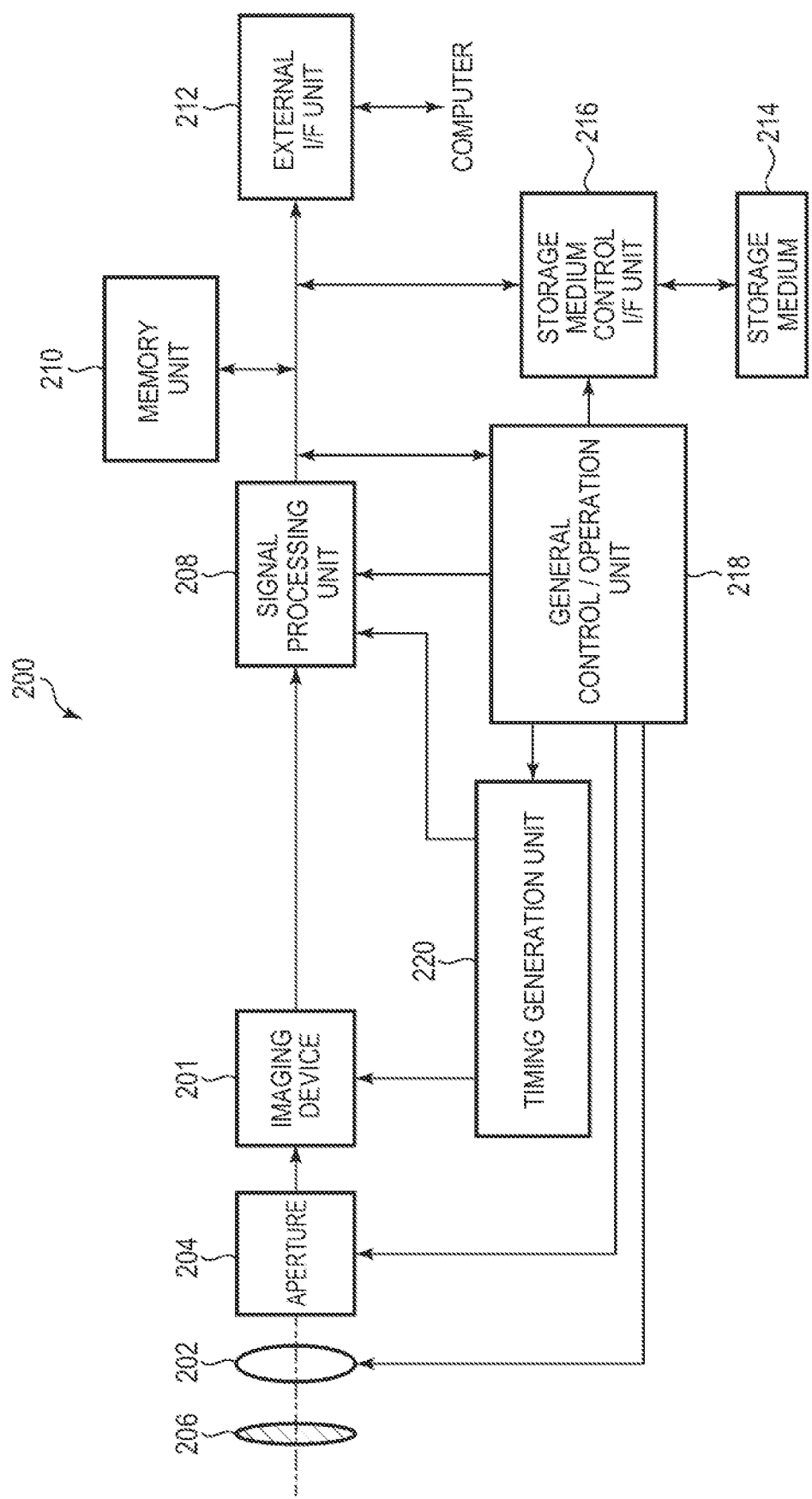
FIG. 10 is a block diagram illustrating a general configuration of a photoelectric conversion system according to a fourth embodiment of the present disclosure.

A photoelectric conversion system according to a fourth embodiment of the present disclosure will be described with reference to FIG. 10. FIG. 10 is a block diagram illustrating a general configuration of the photoelectric conversion system according to the present embodiment.

The photoelectric conversion device 100 described in the first to third embodiments can be applied to various photoelectric conversion systems. Examples of applicable photoelectric conversion systems may include an imaging system such as a digital still camera, a digital camcorder, a surveillance camera, a copying machine, a fax machine, a mobile phone, an on-vehicle camera, an observation satellite, and a range-finding system that measures distances without imaging. In addition, a camera module including an optical system such as a lens and an imaging device is also included in the imaging system. FIG. 10 illustrates a block diagram of a digital still camera as an example of these examples.

An imaging system 200 illustrated in FIG. 10 includes an imaging device 201, a lens 202 that forms an optical image of an object on the imaging device 201, an aperture 204 for varying the amount of light passing through the lens 202, and a barrier 206 for protecting the lens 202. The lens 202 and the aperture 204 are an optical system that collects a light onto the imaging device 201. The imaging device 201 is the photoelectric conversion device 100 described in any one of the first to third embodiments, and converts the optical image formed by the lens 202 into image data.

The imaging system 200 also includes a signal processing unit 208 that processes a signal output from the imaging device 201. The signal processing unit 208 generates image data from digital signals output from the imaging device 201. The signal processing unit 208 performs operations of performing various corrections or compressions as necessary to output image data. The imaging device 201 may include an AD conversion unit that generates the digital signal to be processed in the signal processing unit 208. The AD conversion unit may be formed on a semiconductor layer (semiconductor substrate) in which the photoelectric converter of the imaging device 201 is formed, or may be formed on a semiconductor substrate different from the semiconductor layer in which the photoelectric converter of the imaging device 201 is formed. The signal processing unit 208 may be formed on the same semiconductor substrate as the imaging device 201.

The imaging system 200 further includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of the imaging data, and a storage medium control interface unit (storage medium control I/F unit) 216 for performing storage or readout the imaging data on the storage medium 214. The storage medium 214 may be embedded in the imaging system 200 or may be removable.

The imaging system 200 further includes a general control/operation unit 218 that performs various calculation and controls the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs an imaging signal to the signal processing unit 208. The signal processing unit 208 performs predetermined signal processing on the imaging signal output from the imaging device 201 and outputs image data. The signal processing unit 208 generates an image by using the imaging signal.

As described above, according to the present embodiment, the imaging system to which the photoelectric conversion device 100 according to the first to third embodiments is applied can be realized.

Fifth Embodiment

Figure 11A:
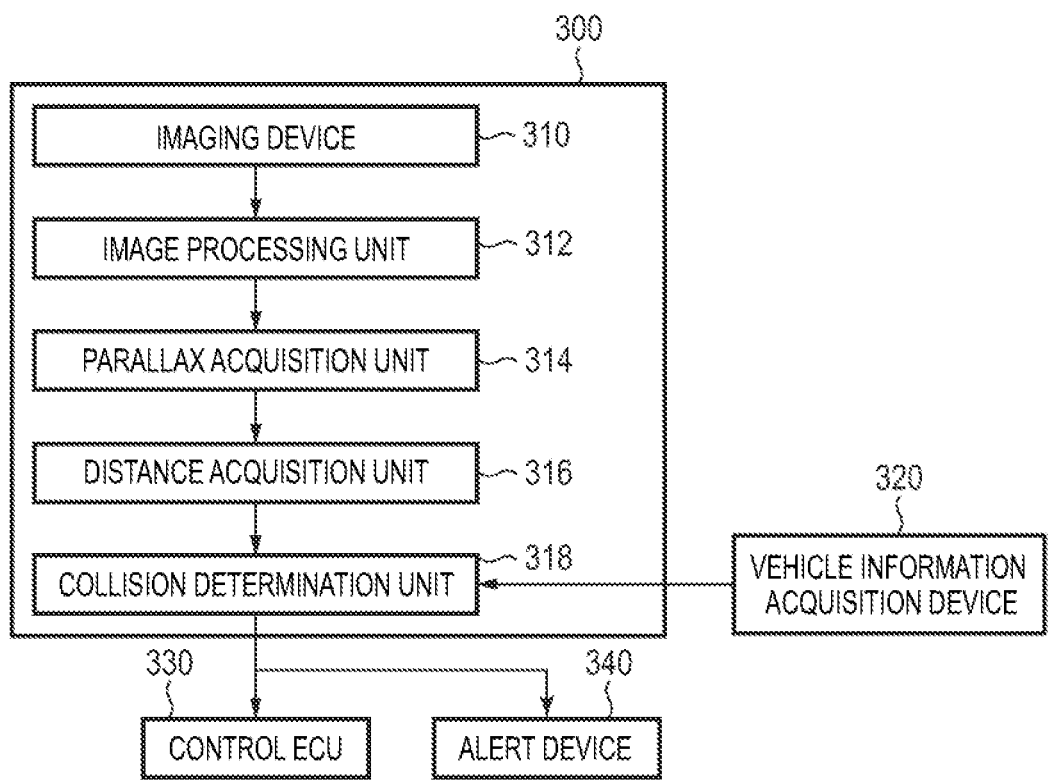
FIG. 11A is a diagram illustrating a configuration example of a photoelectric conversion system according to a fifth embodiment of the present disclosure.
Figure 11B:
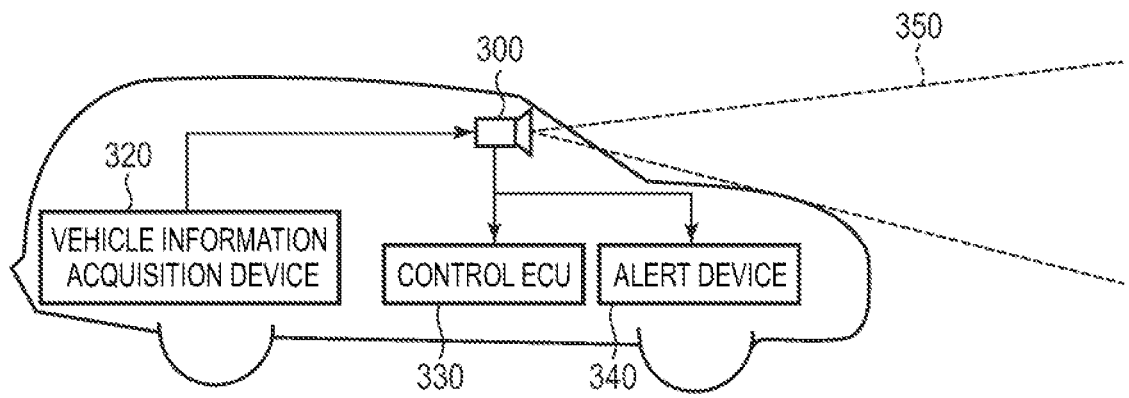
FIG. 11B is a diagram illustrating a configuration example of a movable object according to the fifth embodiment of the present disclosure.

A photoelectric conversion system and a movable object according to a fifth embodiment of the present disclosure will be described with reference to FIG. 11A and FIG. 11B. FIG. 11A is a diagram showing a configuration of a photoelectric conversion system according to the present embodiment. FIG. 11B is a diagram illustrating a configuration of the movable object according to the present embodiment.

FIG. 11A illustrates an example of an imaging system related to an on-vehicle camera. An imaging system 300 includes an imaging device 310. The imaging device 310 is the photoelectric conversion device 100 according to any one of the above-described first to third embodiments. The imaging system 300 includes an image processing unit 312 that performs image processing on a plurality of image data acquired by the imaging device 310, and a parallax acquisition unit 314 that calculate parallax (a phase difference of parallax images) from the plurality of image data acquired by the imaging system 300. The imaging system 300 includes a distance acquisition unit 316 that calculates a distance to the object based on the calculated parallax, and a collision determination unit 318 that determines whether or not there is a possibility of collision based on the calculated distance. Here, the parallax acquisition unit 314 and the distance acquisition unit 316 are examples of distance information acquisition unit that acquires distance information o the distance to the object. That is, the distance information is information on a parallax, a defocus amount, a distance to an object, or the like. The collision determination unit 318 may use any of the distance information to determine the possibility of collision. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like, or may be implemented by a combination thereof.

The imaging system 300 is connected to the vehicle information acquisition device 320, and can acquire vehicle information such as vehicle speed, a yaw rate, and a steering angle, or the like. Further, the imaging system 300 is connected to a control ECU 330, which is a control device that outputs a control signal for causing a vehicle to generate braking force based on the determination result by the collision determination unit 318. The imaging system 300 is also connected to an alert device 340 that issues an alert to the driver based on the result of the determination by the collision determination unit 318. For example, when the collision determination unit 318 determines that there is a high possibility of a collision, the control ECU 330 performs vehicle control to avoid a collision and reduce damage by applying a brake, pushing back an accelerator, suppressing engine power, or the like. The alert device 340 alerts the user by sounding an alert such as a sound, displaying alert information on a screen of a car navigation system or the like, providing vibration to a seat belt or a steering wheel, or the like.

In the embodiment, the periphery of the vehicle, for example, a front area or a rear area, is captured by using the imaging system 300. FIG. 11B illustrates an imaging system for capturing the front area of the vehicle (a capturing area 350). The vehicle information acquisition device 320 transmits an instruction to the imaging system 300 or the imaging device 310. With this configuration, the accuracy of distance measurement may be further improved.

In the above description, an example in which the vehicle is controlled so as not to collide with another vehicle is described, but the present embodiment may also be applied to automatic driving control for following another vehicle, automatic driving control for not going out of a traffic lane, or the like. Furthermore, the imaging system is not limited to a vehicle such as the subject vehicle, but can be applied to a movable object (moving apparatus) such as a ship, an aircraft, or an industrial robot, for example. In addition, the imaging system can be widely applied to a device which utilizes object recognition, such as an intelligent transportation system (ITS), without being limited to movable objects.

Modified Embodiments

The present disclosure is not limited to the above-described embodiments, and various modifications are possible.

For example, an example in which a part of the configuration of any one of the embodiments is added to another embodiment or an example in which a part of the configuration of any one of the embodiments is replaced with a part of the configuration of another embodiment is also one of the embodiments of the present disclosure.

The circuit configuration of the unit pixel 12 illustrated in the above-described embodiments is an example, and the present disclosure is not limited thereto. The unit pixel 12 may be a pupil division pixel having at least one pair of photoelectric converters for receiving light passing through a pair of pupil regions, and may have at least two photoelectric converters. The configuration of the in-pixel readout circuit is not limited to the configuration illustrated in FIG. 2, and may be changed appropriately.

In the second and third embodiments, the Bayer arrangement is shown as an example of the color filter arrangement, but the color filter arrangement is not limited thereto. The color filter arrangement may be not only an RGB arrangement but a CMY arrangement including a C pixel having a cyan color filter, an M pixel having a magenta color filter, and a Y pixel having a yellow color filter. In addition to these color pixels, the unit pixels 12 constituting the pixel array unit 10 may include pixels for directly detecting incident light without color separation (white pixel) and pixels for infrared detection (Ir pixel). The unit pixels 12 for outputting the A-image SAD signal and the arrangement thereof may be appropriately changed in accordance with the color filter arrangement.

In the above-described embodiments, the photoelectric conversion device 100 including the AD conversion unit 40 and outputting a digital signal is described as an example, but the photoelectric conversion device 100 does not necessarily include the AD conversion unit 40. In this case, the column memory constituting the memory unit 50 may be sample-and-hold capacitors for holding the analog pixel signals output from the unit pixels 12.

The above-described imaging system according to the fourth and fifth embodiments is an example of an imaging system to which the photoelectric conversion device of the present disclosure may be applied, and the imaging system to which the photoelectric conversion device of the present disclosure may be applied is not limited to the configuration illustrated in FIG. 10 and FIG. 11A.

Embodiments of the present disclosure can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-081041, filed May 1, 2020, which is hereby incorporated by reference herein in its entirety.

What is claimed is:

1. A photoelectric conversion device comprising:
a plurality of pixels arranged to form a plurality of rows and a plurality of columns, each of the plurality of pixels including a first photoelectric converter and a second photoelectric converter;
a memory unit including a plurality of column memories each provided to corresponding one of the plurality of columns, each of the plurality of column memories being configured to hold a signal output from the pixel on the corresponding column; and
a transfer unit configured to sequentially transfer the signals held in the memory unit to a processing unit in a subsequent stage on a column-by-column basis,
wherein each of the plurality of pixels is configured to be capable of outputting at least one of a first signal based on a signal from the first photoelectric converter, and a second signal based on signals from the first photoelectric converter and the second photoelectric converter,
wherein the number of the first signals output from the plurality of pixels is smaller than the number of the second signals output from the plurality of pixels,
wherein a column at which a pixel arranged on a first row and outputting the first signal is arranged is different from a column at which a pixel arranged on a second row different from the first row and outputting the first signal is arranged,
wherein the transfer unit is configured to perform on a row-by-row basis a first transfer period of transferring the first signal held in the memory unit and a second transfer period of transferring a plurality of second signals held in the memory unit, and
wherein a column at which a pixel outputting the first signal to be transferred during the first period of the first row is arranged is different from a column at which a pixel outputting the first signal to be transferred during the first period of the second row is arranged.

2. The photoelectric conversion device according to claim 1,
wherein the plurality of columns are divided into a plurality of column blocks including at least a first column block and a second column block, and
wherein the transfer unit is configured to
transfer the first signal output from a pixel included in the second column block while not transfer the first signal output from a pixel included in the first column block in the first transfer period of the first row,
transfer the first signal output from a pixel included in the first column block while not transfer the first signal output from a pixel included in the second column block in the first transfer period of the second row, and
transfer the second signal output from the pixel included in the first column block and the second signal output from the pixel included in the second column block in the second transfer period of the first row and in the second transfer period of the second row.

3. The photoelectric conversion device according to claim 1,
wherein each of the first row and the second row includes a first pixel having sensitivity to a first color and a second pixel having sensitivity to a color different from the first color, and the first pixel of the first row is arranged in a column different from a column in which the first pixel of the second row is arranged, and
wherein the transfer unit is configured to
transfer the first signal output from the first pixel and not transfer the first signal output from the second pixel in the first transfer period of the first row and in the first transfer period of the second row, and
transfer the second signal output from the first pixel and the second signal output from the second pixel in the second transfer period of the first row and in the second transfer period of the second row.

4. The photoelectric conversion device according to claim 3, wherein the transfer unit transfers a part of a plurality of the first signals output from a plurality of the first pixels in the first transfer period of the first row and in the first transfer period of the second row.

5. The photoelectric conversion device according to claim 3, wherein the first pixel and the second pixel are alternately arranged in each of the first row and the second row.

6. The photoelectric conversion device according to claim 3,
wherein the first pixel is a G pixel having sensitivity to green, and
wherein the second pixel is an R pixel having sensitivity to red or a B pixel having sensitivity to blue.

7. The photoelectric conversion device according to claim 1, wherein the processing unit adds two or more of the first signals and outputs added signal.

8. The photoelectric conversion device according to claim 7, wherein the two or more of the first signals are the first signals output from the pixels in different rows in one column.

9. The photoelectric conversion device according to claim 7, wherein the two or more of the first signals are the first signals output from the pixels in different columns in one row.

10. The photoelectric conversion device according to claim 7, wherein the two or more of the first signals are the first signals output from the pixels having sensitivity to the same color.

11. The photoelectric conversion device according to claim 7, wherein the two or more of the first signals are the first signals output from the pixels having sensitivity to the same color included in a unit pixel block constituting a minimum repeating unit of color filters.

12. The photoelectric conversion device according to claim 1, wherein the plurality of rows is are formed by periodically arranging row blocks each including two or more rows including the first row and the second row.

13. The photoelectric conversion device according to claim 1, wherein the first row and the second row are adjacent to each other.

14. The photoelectric conversion device according to claim 1 further comprising an AD conversion unit configured to convert an analog signal output from the pixel to a digital signal,
wherein the first signal is a digital signal converted from an analog signal based on a signal from the first photoelectric converter by the AD conversion unit, and
wherein the second signal is a digital signal converted from an analog signal based on signals from the first photoelectric converter and the second photoelectric converter by the AD conversion unit.

15. The photoelectric conversion device according to claim 1,
wherein the first signal is a signal for focus detection, and
wherein the second signal is a signal for image generation.

16. The photoelectric conversion device according to claim 1, wherein each of the first signal and the second signal includes a noise signal and a light detection signal.

17. A photoelectric conversion system comprising:
the photoelectric conversion device according to claim 1; and
a signal processing unit configured to process signals output from the photoelectric conversion device.

18. A movable object comprising:
the photoelectric conversion device according to claim 1;
a distance information acquisition unit that acquires distance information on a distance to an object, from a parallax image based on the first signals; and
a control unit that controls the movable object based on the distance information.

* * * * *